United States Patent
Dhawan et al.

(10) Patent No.: US 12,333,553 B2
(45) Date of Patent: Jun. 17, 2025

(54) SYSTEMS AND METHODS TO TRIAGE CONTACT CENTER ISSUES USING AN INCIDENT GRIEVANCE SCORE

(71) Applicant: NICE LTD., Ra'anana (IL)

(72) Inventors: Salil Dhawan, Pune (IN); Swati Pranay Kadu, Pune (IN); Yuvraj Amrutrao Sawant, Pune (IN)

(73) Assignee: NICE LTD., Ra'anana (IL)

( * ) Notice: Subject to any disclaimer, the term of this patent is extended or adjusted under 35 U.S.C. 154(b) by 441 days.

(21) Appl. No.: 17/165,449

(22) Filed: Feb. 2, 2021

(65) Prior Publication Data

US 2022/0245647 A1     Aug. 4, 2022

(51) Int. Cl.
*G06Q 30/016*     (2023.01)
*G06Q 10/10*     (2023.01)
*G06Q 30/02*     (2023.01)
*H04M 3/51*     (2006.01)

(52) U.S. Cl.
CPC ....... *G06Q 30/016* (2013.01); *G06Q 30/0281* (2013.01); *H04M 3/5183* (2013.01); *G06Q 10/103* (2013.01)

(58) Field of Classification Search
CPC ............. G06Q 30/016; G06Q 30/0281; G06Q 10/103; H04M 3/5183
See application file for complete search history.

(56) References Cited

U.S. PATENT DOCUMENTS

| | | | |
|---|---|---|---|
| 5,291,550 A * | 3/1994 | Levy ..................... | H04M 3/523 379/112.09 |
| 6,763,088 B1 * | 7/2004 | Clements ............ | H04M 3/5183 379/38 |
| 7,426,267 B1 * | 9/2008 | Caseau ............... | H04M 3/5232 379/265.06 |

(Continued)

FOREIGN PATENT DOCUMENTS

| | | | | |
|---|---|---|---|---|
| CA | 3108013 C | * | 5/2024 | |
| EP | 1107557 A2 | * | 6/2001 | .......... H04M 3/5233 |
| WO | WO-2022123301 A1 | * | 6/2022 | .......... G06Q 30/0281 |

OTHER PUBLICATIONS

S. Yoon and L. A. Albert, "An expected coverage model with a cutoff priority queue," Health Care Manag. Sci., vol. 21, (4), pp. 517-533, 2018 (Year: 2018).*

(Continued)

*Primary Examiner* — Gerardo Araque, Jr.
(74) *Attorney, Agent, or Firm* — Haynes and Boone, LLP

(57) ABSTRACT

Systems for and methods of assessing the priority of a customer reported issue include receiving input regarding a customer issue experienced by a customer; calculating an incident grievance score by inserting the received input into a machine learning model; assigning a priority to the customer issue based on the calculated incident grievance score; receiving updated input regarding the customer issue; periodically recalculating the incident grievance score for the customer issue by inserting the received input and the updated input into the machine learning model; changing the (Continued)

priority of the customer issue when the recalculated incident grievance score differs from the calculated incident grievance score; and notifying a team assigned to fix the customer issue when the priority of the customer issue changes.

18 Claims, 7 Drawing Sheets

(56) References Cited

U.S. PATENT DOCUMENTS

| | | | | |
|---|---|---|---|---|
| 7,761,323 B2* | 7/2010 | Rafter | ............... | G06Q 10/1095 |
| | | | | 705/7.31 |
| 7,778,862 B2* | 8/2010 | Vaccarelli | .......... | G06Q 30/0203 |
| | | | | 705/7.32 |
| 8,976,955 B2* | 3/2015 | Liberman Ben-Ami | ..................... | |
| | | | | H04M 3/5191 |
| | | | | 379/265.09 |
| 10,412,224 B1* | 9/2019 | Merritt | ............... | G06Q 30/0282 |
| 11,165,907 B1* | 11/2021 | Kang | .................. | H04M 3/5237 |
| 11,863,708 B2* | 1/2024 | Kan | ........................ | H04M 5/00 |
| 11,968,326 B2* | 4/2024 | Soundar | .............. | H04M 3/5175 |
| 2007/0206769 A1* | 9/2007 | O'Dell | ................ | H04M 3/5237 |
| | | | | 379/265.01 |
| 2008/0226059 A1* | 9/2008 | Shaffer | ............... | H04M 3/5232 |
| | | | | 379/266.05 |
| 2012/0259540 A1* | 10/2012 | Kishore | ................. | G06Q 10/06 |
| | | | | 705/7.14 |
| 2013/0262320 A1* | 10/2013 | Makanawala | ........... | H04L 51/52 |
| | | | | 705/304 |
| 2014/0046858 A1* | 2/2014 | Werner | .................. | G06Q 30/01 |
| | | | | 705/304 |
| 2020/0021503 A1* | 1/2020 | de Lima | ............. | H04L 41/0896 |
| 2021/0352178 A1* | 11/2021 | Philip | .................. | H04M 3/5233 |
| 2024/0089376 A1* | 3/2024 | Kan | ..................... | H04M 3/5233 |

OTHER PUBLICATIONS

S. Langford, "Incoming call management—Technology trends," Telemarketing, vol. 13, (10), pp. 70, 1995 (Year: 1995).*

Specialty Answering Service "Queueing Theory and Call Centers" Sep. 14, 2015, https://web.archive.org/web/20150914010631/https://www.specialtyansweringservice.net/wp-content/uploads/resources_papers/queueing-theory-call-centers/Queueing-Theory-and-Call-Centers.pdf (Year: 2015).*

Anonymous "Customer Interaction—Keep it simple: 8 Ways to re-energise customer service," M2 Presswire, pp. NA, 2018 (Year: 2018).*

M. L'Ecuyer, "Using skills-based routing to enhance contact center revenue and performance. (Call Center/CRM Management Scope)," Customer Interaction Solutions, vol. 21, (11), p. 64(4), 2003. (Year: 2003).*

IBM "Method for Call Filtering and Routing Combining Voice Identification, User Profiling, Emotional State Detection and Other Factors", Feb. 1, 2008 (Year: 2008).*

Mercion et al "Intelligent Predictive Cloud Based Traffic Distribution", Mar. 5, 2018 (Year: 2018).*

* cited by examiner

110

Report An Issue ✖

TRACE ID
48485a3953bb6124

ISSUE SUMMARY * ⟵ 112

[Team creation issue]

ISSUE DESCRIPTION ⟵ 114

[                    ]

SEVERITY * ⟵ 116
○ Critical   ○ Major   ○ Minor   ○ Trivial

UPLOAD DOCUMENT (RECORDING / SCREENSHOT)

⤓ Drag & drop to upload or browse for files

118 ⟵ [Submit]   [Cancel]

| Post | |
|---|---|
| Description | This api is responsible to report issue |
| Authorized Callers | Any |
| URL | /issuereportingsystem/report/issue |
| Request Type | POST |
| Authentication | Token required |
| SDK | Interface: IssueReportingClientImpl<br><br>Method: reportIssue() |
| Request Example | Request:<br>{<br>"traceId" : "343535353343",<br>"startTime" : "2020-11-26T18:53:17.030+05:30",<br>"endTime" : "2020-11-26T18:53:17.040+05:30",<br>"service" : "user-manager",<br>"application" : "admin-webapp",<br>"userId" : "11eae30c-003d-6e00-8be5-0242ac110003",<br>"tenantId" : "11e810a0-b348-6cc0-bbe8-c85b76b88c8b",<br>"errorCode" : 500,<br>"errorMessage" : "Request Timed Out"<br>} |
| Response Example | Response : 200 Ok<br>{<br>"IncidentNumber" : "IC-4506"<br><br>} |

The Request Example content is bracketed as 205.

FIG. 2

SYSTEMS AND METHODS TO TRIAGE CONTACT CENTER ISSUES USING AN INCIDENT GRIEVANCE SCORE

TECHNICAL FIELD

The present disclosure relates to methods, apparatus, and systems to prioritize issues in a contact center, and more particularly, to methods, apparatus, and systems that continuously reassess the priority of customer reported issues by calculation and recalculation of an incident grievance score, which results in quicker resolution of customer issues.

BACKGROUND

In a contact center, it a paramount to address priority issues so that a business can continue without any disruptions. Not addressing these issues could lead to losses to contact centers, and critical services like healthcare can be severely impacted, which could be life threatening at times.

Existing triage processes are inefficient and time consuming, which can result in unexpected delays. In addition, existing methods are not supported by sufficient and appropriate data points that can continuously assess the impact of the issue.

Typically, when a customer reports an issue, a technical account manager (TAM) generates an issue report for further investigation. After this, the issue is triaged by a focus group that meets periodically and updates the impact and priority of the issue. The customer is not informed about any incremental progress on the issue, and no feedback is provided after information on issue resolution is gathered. The technical team assigned to fix the customer issue is not alerted when the priority of the issue changes or is nearing a service level agreement (SLA) violation. Critical factors such as the type of license involved, the number of agents impacted, and degradation in service are significant, but are not currently accounted for in the typical prioritization of issues. For example, healthcare call center issues need to be resolved faster than e-commerce call center issues because healthcare call center issues often deal with life threatening issues that hold higher priority. Moreover, there is no streamlined process for communication among the parties involved, which leads to lack of clarity at the customer and technical team end.

Thus, there is a need for a solution that will proactively prioritize customer reported issues on the basis of attributes that impact critical businesses like healthcare, translation services, and emergency services.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1B is an exemplary graphical user interface showing a form that a customer can complete to report an issue according to aspects of the present disclosure.

FIG. 2 is an exemplary application programming interface for submitting a customer issue from an application to the issue triaging system according to aspects of the present disclosure.

DETAILED DESCRIPTION

This description and the accompanying drawings that illustrate aspects, embodiments, implementations, or applications should not be taken as limiting—the claims define the protected invention. Various software, machine learning, mechanical, compositional, structural, electrical, and operational changes may be made without departing from the spirit and scope of this description and the claims. In some instances, well-known machine logic, circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present disclosure describes systems and methods that proactively and continuously reassess the priority of customer reported issues based on attributes related to the contact center industry that impacts critical businesses. In particular, the present disclosure describes methods that provide optimal prioritization of customer reported issues by calculation and recalculation of an incident grievance score, which results in quicker resolution of customer issues.

In several embodiments, an issue triaging system, which includes a priority analytics engine, calculates the incident grievance score. The incident grievance score helps to set the correct priority of the customer issue by giving higher precedence to issues that could cause more injury to customers. In some embodiments, a machine learning model is used to predict the priority of the customer issue based on inputs to the incident grievance score. Advantageously, the solution described herein streamlines complaint management workflows so the most urgent requests are put in the front of the line for resolution.

Figure 1A:
FIG. 1A is an exemplary graphical user interface that provides an option to a customer to report an issue according to aspects of the present disclosure.

In various embodiments, the present systems and methods provide customers the option to report issues from an application on any non-network related errors. FIG. 1A is an exemplary graphical user interface (GUI) 100 that provides an option 105 to report an issue. Should the customer decide to report the issue, the customer can complete or fill out a form with details regarding the issue. FIG. 1B is an exemplary GUI 110 showing a form that the customer can fill out. For example, the customer can provide an issue summary 112, an issue description 114, and a severity of the issue 116. Once the customer clicks the submit button 118, the customer inputs, trace ID, application programming interface (API), service, error code, application, service, user ID, and tenant ID details are captured and submitted to the issue triaging system. FIG. 2 is an exemplary API 200 for submitting the customer issue from the application to the issue triaging system, which includes information 205 regarding the customer issue.

In various embodiments, the issue triaging system checks if a similar customer issue has been reported in an open issues list by identifying the application, service, error code, and error message captured when the customer reported the issue. The issue triaging system can also check data visualization tools, such as Kibana logs, to evaluate how many customers and agents are impacted by the reported customer issue. If no similar customer issue is found, a new incident report in a workflow management tool (such as Jira) can be created, and priority is set based on the incident grievance score. If a similar customer issue is reported again, the issue triaging system does not create another incident report, but recalculates the incident grievance score of the existing customer issue and sets the priority of the customer issue accordingly.

In certain embodiments, the relevant technical team is identified and assigned the reported issue to handle based on the application and service involved. In several embodiments, a mapping for application, service, and technical team is maintained to determine the exact technical team that is assigned the customer issue. From this mapping, it is easier to inform the technical team about the status of the customer issue in the event of any update. Table 1 below is an example of a mapping.

TABLE 1

APPLICATION-SERVICE-TECHNICAL TEAM MAPPING

| Application | Service | Technical Team Name | Technical Team Email | Technical Team Point of Contact Email |
|---|---|---|---|---|
| User Management | User-manager | UserHub Team | UserHub@xyz.com | A.B@xyz.com |

Figure 3:
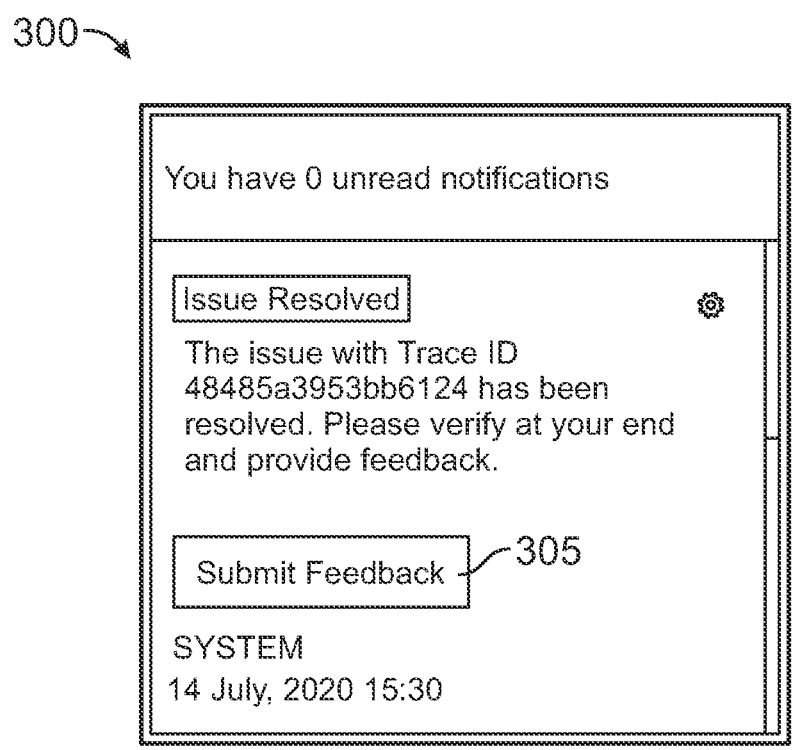
FIG. 3 is an exemplary notification showing that the customer is notified that a customer issue is resolved according to aspects of the present disclosure.

In some embodiments, the issue triaging system recalculates the incident grievance score on a daily basis (or on a different basis, e.g., hourly, weekly, monthly, or otherwise) and changes the priority of the customer issue accordingly. In various embodiments, the issue triaging system notifies (e.g., sends an email) the technical team that is assigned the customer issue when the priority of the customer issue changes or a customer issue is nearing or in an SLA violation. This allows the technical team to prioritize and fix the customer issue. In an exemplary embodiment, customers are notified when the issue is fixed, feedback is gathered from the customer, and the issue is closed by customer consensus. FIG. 3 is an exemplary notification 300 showing that the customer is notified that the issue is resolved, and providing an option 305 for the customer to submit feedback.

The present systems and methods provide several advantages to the contact center. First, the operational efficiency of the contact center is improved because of prioritization and timely resolution of issues. Second, optimal utilization of resources in the contact center is promoted. The best resources will be channeled to the most critical issues. Third, the contact center experiences improved customer satisfaction scores because of better customer service. In several embodiments, customers receive a more accurate estimation of how long they need to wait before an issue is resolved, and are periodically updated on the status of the issue. The focus remains on the customer and the urgency of an issue the customer is experiencing, while also evaluating agent performance. In some embodiments, the present methods and systems provide a way for the contact center to improve inefficient processes, slower-than-expected systems, training, and high agent attrition rate. The contact center can fill in these gaps for more efficient operations. Finally, the invention can provide effective and optimal training assignments that can save cost and enhance agent productivity.

Figure 4:
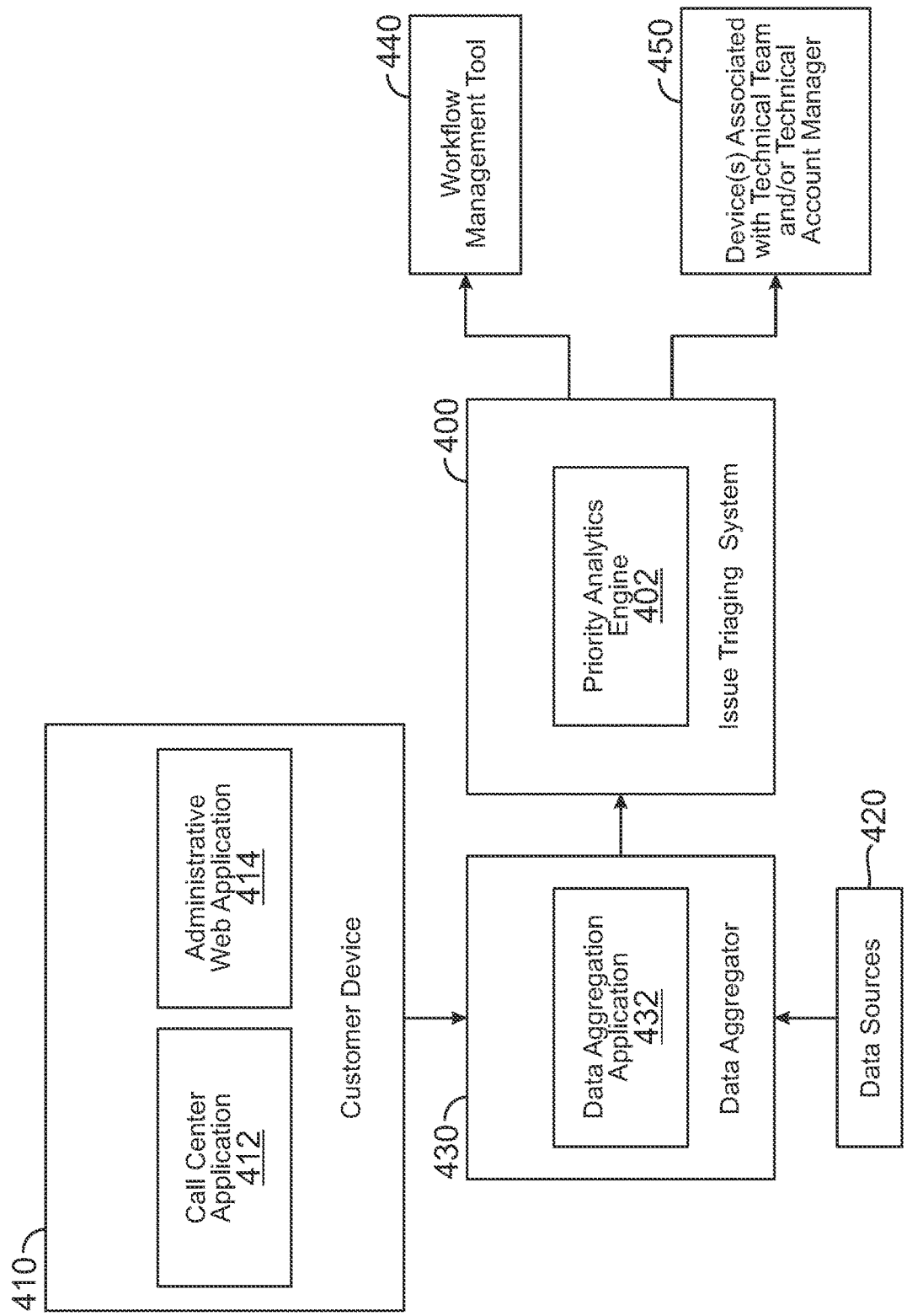
FIG. 4 is a simplified block diagram showing the different devices and applications that interact with the issue triaging system according to aspects of the present disclosure.

FIG. 4 is a simplified block diagram showing the different devices and applications that interact with the issue triaging system 400 that includes a priority analytics engine 402 according to various aspects of the present disclosure. The devices and applications include a customer device 410 that include, or can access, a call center application 412 and an administrative web application 414; a data aggregator 430; data sources 420 that provide data to data aggregator 430; a workflow management tool 440; and one or more devices associated with a technical team and/or a technical account manager (TAM) 450.

Call center application 412 and administrative web application 414 serve as input data sources for the customer issue. Additional input data sources 420 can include a customer relationship management platform, such as Salesforce, which provides customer account details, and a metrics repository, such as Amazon CloudWatch, which provides system and application logs and application monitoring data. Information from call center application 412, administrative web application 414, and data sources 420 can include data regarding whether the customer issue is a security issue, the severity of the issue, the number of customers impacted by the issue, the age of the issue, the number of agents impacted by the issue, any SLA violation timelines, whether the issue is impacting call handling, whether a workaround is available, and the type of license involved, and any combination of the foregoing.

Data aggregator 430 collects and collates data from the input data sources (e.g., call center application 412, administrative web application 414, and data sources 420) and organizes the data for further use. In various embodiments, data aggregator 430 includes a data aggregation application 432 that is used to transmit the data to issue triaging system 400. In some embodiments, data aggregator 430 receives the data in real-time.

Issue triaging system 400 includes priority analytics engine 402, which is responsible for calculating the incident grievance score. Once all the data pertaining to the customer issue is made available to priority analytics engine 402, priority analytics engine 402 utilizes a machine learning model to predict or calculate the incident grievance score.

In some embodiments, issue triaging system 400 determines if the customer issue was previously reported. If not, issue triaging system 400 reports the customer issue to a workflow management tool 440, such as Jira. In several embodiments, issue triaging system 400 provides the incident grievance score to concerned stakeholders 450 (e.g., the technical team and technical account manager).

In an exemplary embodiment, one or more of the devices or applications shown in FIG. 4 uses a microservice architecture to support high availability and autoscaling, along with application logging and monitoring. In one embodiment, each of the microservices is installed inside a docket container such as Amazon EC2 Instance. Amazon EC2 Instance is a virtual server in Amazon's Elastic Compute Cloud (EC2) for running applications on Amazon Web Services (AWS) infrastructure. Each microservice has at least two instances or can be configured to many instances to provide high availability solutions with different configurations of central processing unit (CPU), storage, and networking resources to suit user needs.

In several embodiments, an elastic load balancer (ELB) is attached to every microservice instance. Elastic load balancing is a load-balancing service of AWS deployments. ELB automatically distributes incoming application traffic and scales resources to meet traffic demands. The purpose of automatic scaling is to automatically increase the size of the auto scaling group when demand goes up and decrease it when demand goes down. As capacity is increased or decreased, the Amazon EC2 instances being added or removed must be registered or deregistered with a load balancer. This enables the application to automatically distribute incoming web traffic across a dynamically changing number of instances. In various embodiments, the microservice logs data to AWS logs and has monitoring parameters configured in AWS CloudWatch metrics.

Figure 5:
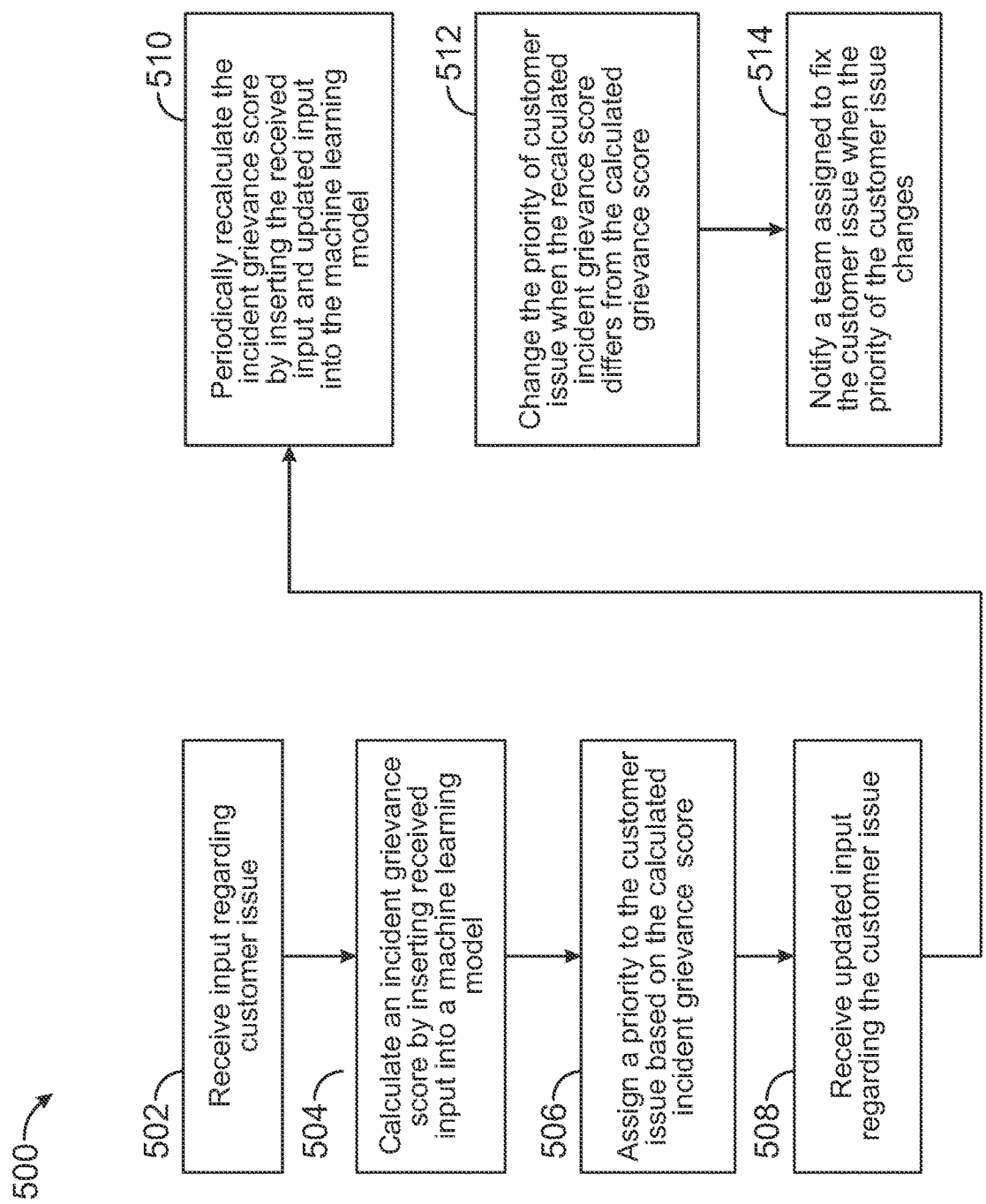
FIG. 5 is a flowchart of a method of assessing the priority of a customer reported issue according to embodiments of the present disclosure.

Referring now to FIG. 5, a method 500 for assessing the priority of a customer reported issue is described. At step 502, issue triaging system 400 receives input regarding a customer issue experienced by a customer. In various embodiments, the input is received from data aggregation application 432 of data aggregator 430. In several embodiments, the input includes customer account details, data from an application log, application monitoring data, or a combination thereof. In certain embodiments, the input includes one or more of an account impact rank; a severity of the customer issue; whether the customer issue is a security issue; a number and type of customer impacted by the customer issue; an age of the customer issue; a number of agents impacted by the customer issue; whether a service level agreement (SLA) is violated or approaching a violation; whether there is a degradation in handling of a customer communication; whether a workaround is available; a type of license involved in the customer issue; a number of license specific monitoring parameters affected by the customer issue; or a number of service and application monitoring parameters affected by the customer issue. Security typically holds a high priority due to the risk of compromising of systems and also the risk of violating government rules and regulations. The type of license involved may be an automated call distributor (ACD), workforce management (WFM), or quality management (QM) license. The license specific monitoring parameters are generally available from application monitoring data and include, for example, ACD call queue size, call drop rate, and recording failure. These parameters are preferably captured at the same time frame as the failed API turnaround time. The service and application specific monitoring parameters are usually available from application monitoring data and include, for example, Amazon CloudWatch metrics for relational database service (RDS) utilization, service CPU utilization, and service downtime. These parameters are preferably captured at the same time frame as the failed API turnaround time.

As explained above, data aggregator 430 can receive and collate this information from call center application 412, administrative web application 414, and data sources 420. In certain embodiments, call center application 412 or administrative web application 414 provides an option for a customer to report an issue so issue triaging system 400 can gather all the relevant information related to the reported issue. For example, the customer may submit the following information through call center application 412 or administrative web application 414: trace ID (trace ID for failed request), start time, end time, service name, application name, user ID (ID of user or agent for whom request failed), tenant ID of the customer, and error details (error code and error message of the request). License information can be obtained from a tenant table, while license specific monitoring parameters and service and application specific monitoring parameters can be obtained from a metrics repository. Table 2 below is an example of a tenant table, and Table 3 is an example of a user table.

TABLE 2

TENANT TABLE

| Tenant ID | Tenant Name | Tenant Email | Tenant Point of Contact Email | Tenant Licenses | TAM email |
|---|---|---|---|---|---|
| 1033-1323-xerer-4343 | Nice Interactive Systems | info@nice.com | contactus@nice.com | ACD, QM, WFM | tam.Nice@nice.com |

TABLE 3

USER TABLE

| User ID | Tenant ID | First Name | Last Name | Email | Role |
|---|---|---|---|---|---|
| 1033-1323-xerer-3232 | 1033-1323-xerer-4343 | XYX | K | ixyz@nice.com | Agent |

In several embodiments, issue triaging system 400 determines if a similar customer issue was previously reported, e.g., by the same or a different customer. As discussed above, for each customer issue reported, a trace ID, service name, application name, and error code may be captured. Using this information, issue triaging system 400 can determine if the reported customer issue is similar to an existing customer issue. If the service name, application name, and error code match a previously reported customer issue, issue triaging system 400 determines that the reported customer issue is similar to an existing customer issue. In certain embodiments, if issue triaging system 400 determines the reporting issue is similar to or the same as an existing customer issue, issue triaging system 400 recalculates the priority of the existing customer issue with updated input. If no similar customer issue is found, issue triaging system 400 determines that the reported customer issue was not previously reported, and creates an incident report from the received input in workflow management tool 440.

In some embodiments, issue triaging system 400 analyzes application logs to determine how many (or how many unique) agents and customers have encountered the reported customer issue. To get the count of impacted agents and customers, issue triaging system 400 can analyze the application logs for a time period, for example, over 15 to 30 days. In an exemplary embodiment, this period is configurable.

At step 504, issue triaging system 400, via the priority analytics engine 402, calculates an incident grievance score by inserting the received input into a machine learning model. In various embodiments, the received input includes one or more of an account impact rank; a severity of the customer issue; whether the customer issue is a security issue; a number and type of customer impacted by the customer issue; an age of the customer issue (based on minutes, hours, or days since first reported, or first reported by that or any other customer); a number of agents impacted by the customer issue; whether a service level agreement (SLA) is violated or approaching a violation threshold; whether there is a degradation in handling of a customer communication; whether a workaround is available; a type of license involved in the customer issue; a number of license specific monitoring parameters affected by the customer issue; or a number of service and application monitoring parameters affected by the customer issue. The incident grievance score is generally a sum of the received input. In an exemplary embodiment, the machine learning model determines which input parameters to consider and adds a weight for each input parameter to come to a more meaningful, precise number for the incident grievance score.

Account impact rank is an input field that gives higher weight to accounts that handle critical services like healthcare, and is typically provided to issue triaging system 400 by a separate application, such as Salesforce. In general, the bigger the size of the account (e.g., based on number of customers, or based on dollar value, or based on number of transactions over a time period), the larger the impact. One parameter used to calculate the account impact rank is the health score. The health score informs how active the account is and how much business it brings in. In other words, the health score determines the importance of the account in terms of the revenue it brings in, i.e., the health of the account as distinct from the health of customers associated with an account. The factors to be included in the health score typically differ from organization to organization, and may contain some business specific parameters. Table 4 below provides an example of how the account impact rank may be calculated.

TABLE 4

CALCULATION OF ACCOUNT IMPACT RANK

| Parameter | Value | Impact | Formula |
|---|---|---|---|
| Health score | 100 | 7 | If Account on the Incident has a Health Score less than 40, 1 Point<br>If Account on the Incident has a Health Score from 40 to 49.99, 2 Points<br>If Account on the Incident has a Health Score from 50 to 59.99, 3 Points<br>If Account on the Incident has a Health Score from 60 to 69.99, 4 Points<br>If Account on the Incident has a Health Score from 70 to 79.99, 5 Points<br>If Account on the Incident has a Health Score from 80 to 89.99, 6 Point<br>If Account on the Incident has a Health Score from 90 to 99.99, 7 Points |
| Handles critical services | 20 | 20 | If Account handles critical services like healthcare, translation services, accidental insurance, etc., 20 Points |
| Partner | Yes | 2 | Yes = 2, No = 0 |
| Success package | ENTERPRISE PLUS | 8 | If Account on the Incident has a Success Package of "ENTERPRISE PLUS", 8 Points<br>If Account on the Incident has a Success Package of "ENTERPRISE", 6 Points<br>If Account on the Incident has a Success Package of "PREMIER PLUS", 4 Points<br>If Account on the Incident has a Success Package of "PREMIER", 2 Points<br>Else 0 |
| Market segment | Enterprise | 3 | Market Segment<br>If Account on the Incident has a Market Segment of Key, 3 Points<br>If Account on the Incident has a Market Segment of Premier 2 Points<br>Else 0 |
| Specific partner | XYZ | 5 | Specific Partner<br>If Account on the Incident has a Main/Partner Account of Special Partner - 5 Points<br>Else 0 |
| | | SUM (incident | |

TABLE 4-continued

CALCULATION OF ACCOUNT IMPACT RANK

| Parameter | Value | Impact | Formula |
|---|---|---|---|
| | | grievance score) = 45 | |

The severity of the issue can be provided by the customer when the issue is reported, but this can be overridden by a subject matter expert (SME). Whether the customer issue is a security issue is an input field that can be set by the SME. The number and type of customers impacted and the number of agents facing the customer issue can be obtained from application logs. The age of the customer issue is generally the number of days from the time the customer issue was reported. Whether the SLA was violated is an input field that can be updated by the TAM. To determine whether there is a degradation in call handling, the call queue size can be verified. If the call queue size is more than the average call queue size, then there is typically degradation in call handling. Whether there is a workaround available is an input field in reporting the customer issue. The type of license (e.g., ACD, WFM, QM) is available from the customer configuration. The license specific monitoring parameters and service and application specific monitoring parameters are available from application monitoring data.

Table 5 provides a first example of how a machine learning model could calculate an incident grievance score. The measures or parameters considered can change based on the type of issue and the application impacted. For example, a call center application having an issue with the measures related to an ACD license could be considered and have more impact, resulting in a higher incident grievance score.

TABLE 5

CALCULATION OF INCIDENT GRIEVANCE SCORE

| Input Parameter | Value | Multiplier (Weight) | Impact | Formula |
|---|---|---|---|---|
| Account impact rank | 24 | 1 | 24 | See, e.g., Table 4 |
| Severity | S1 | 9 | 9 | S1 = 1.00, S2 = 0.5, S3 = 0 |
| Security issue | Yes | 2 | 2 | Yes = 1, No = 0 |
| Customers impacted | 100 | 1 | 10 | ≤10 = 1, ≤50 = 5, ≤100 = 10 |
| Total number of days bug present | 50 | 1 | 3 | ≥30 days = 3, ≥14 days = 2, <14 days = 1 |
| Count of agents facing issues | 100 | 1 | 10 | ≤10 = 1, ≤50 = 5, ≤100 =10 |
| SLA violated | Yes | 1 | 2 | Yes = 2, No = 0 |
| Degradation in call handling | Yes | 1 | 10 | If call queue is increasing, then set as 10 |
| | | | SUM (incident grievance score) = 70 | |

Table 6 provides a second example of calculating an incident grievance score.

TABLE 6

CALCULATION OF INCIDENT GRIEVANCE SCORE

| Input Parameter | Value | Multiplier (Weight) | Impact | Formula |
|---|---|---|---|---|
| Account impact rank | 24 | 1 | 24 | See, e.g., Table 4 |
| Severity | S1 | 9 | 9 | S1 = 1.00, S2 = 0.5, S3 = 0 |
| Security issue | Yes | 2 | 2 | Yes = 1, No = 0 |
| Customers impacted | 100 | 1 | 10 | ≤10 = 1, ≤50 = 5, ≤100 = 10 |
| Total number of days bug present | 50 | 1 | 3 | ≥30 days = 3, ≥14 days = 2, <14 days = 1 |
| Count of agents facing issues | 100 | 1 | 10 | ≤10 = 1, ≤50 = 5, ≤100 = 10 |
| SLA violated | Yes | 1 | 2 | Yes = 2, No = 0 |
| Degradation in call handling | Yes | 1 | 10 | If call queue size is more than the threshold for that account, then set as 10 |
| Any other ACD monitoring parameter impacted | Yes | 1 | 1 | Increment 1 point per monitoring parameter impacted |
| Any other service level monitoring parameter impacted | Yes | 1 | 1 | Increment 1 point per monitoring parameter impacted |
| | | | SUM (incident grievance score) = 72 | |

Table 7 provides a third example of calculating an incident grievance score, where the score is high due to the account having a high account impact rank.

TABLE 7

CALCULATION OF INCIDENT GRIEVANCE SCORE

| Input Parameter | Value | Multiplier (Weight) | Impact | Formula |
|---|---|---|---|---|
| Account impact rank | 45 | 1 | 45 | See, e.g., Table 4 |
| Severity | S1 | 9 | 9 | S1 = 1.00, S2 = 0.5, S3 = 0 |
| Security issue | Yes | 2 | 2 | Yes = 1, No = 0 |
| Customers impacted | 100 | 1 | 10 | ≤10 = 1, ≤50 = 5, ≤100 = 10 |
| Total number of days bug present | 50 | 1 | 3 | ≥30 days = 3, ≥14 days = 2, <14 days = 1 |
| Count of agents facing issues | 100 | 1 | 10 | ≤10 = 1, ≤50 = 5, |

TABLE 7-continued

CALCULATION OF INCIDENT GRIEVANCE SCORE

| Input Parameter | Value | Multiplier (Weight) | Impact | Formula |
|---|---|---|---|---|
| | | | | ≤100 = 10 |
| SLA violated | Yes | 1 | 2 | Yes = 2, No = 0 |
| Degradation in call handling | Yes | 1 | 10 | If call queue is increasing, then set as 10 |
| Any other ACD monitoring parameter impacted | No | 1 | 0 | Increment 1 point per monitoring parameter impacted |
| Any other service level monitoring parameter impacted | No | 1 | 0 | Increment 1 point per monitoring parameter impacted |
| | | | SUM (incident grievance score) = 91 | |

Table 8 provides a fourth example of calculating an incident grievance score, where the score is lower as the account is not a high priority account.

TABLE 8

CALCULATION OF INCIDENT GRIEVANCE SCORE

| Input Parameter | Value | Multiplier (Weight) | Impact | Formula |
|---|---|---|---|---|
| Account impact rank | 24 | 1 | 24 | See, e.g., Table 4 |
| Severity | S1 | 9 | 9 | S1 = 1.00, S2 = 0.5, S3 = 0 |
| Security issue | Yes | 2 | 2 | Yes = 1, No = 0 |
| Customers impacted | 100 | 1 | 10 | ≤10 = 1, ≤50 = 5, ≤100 = 10 |
| Total number of days bug present | 50 | 1 | 3 | ≥30 days = 3, ≥14 days = 2, <14 days = 1 |
| Count of agents facing issues | 100 | 1 | 10 | ≤10 = 1, ≤50 = 5, ≤100 = 10 |
| SLA violated | Yes | 1 | 2 | Yes = 2, No = 0 |
| Degradation in call handling | Yes | 1 | 10 | If call queue is increasing, then set as 10 |
| Any other ACD monitoring parameter impacted | No | 1 | 0 | Increment 1 point per monitoring parameter impacted |
| Any other service level monitoring parameter impacted | No | 1 | 0 | Increment 1 point per monitoring parameter impacted |
| | | | SUM (incident grievance score) = 70 | |

Table 9 provides a fifth example of calculating an incident grievance score, where the system gives a greater weight to the security issue. In various embodiments, the model will keep adapting to system configurations.

TABLE 9

CALCULATION OF INCIDENT GRIEVANCE SCORE

| Input Parameter | Value | Multiplier (Weight) | Impact | Formula |
|---|---|---|---|---|
| Account impact rank | 24 | 1 | 24 | See, e.g., Table 4 |
| Severity | S1 | 9 | 9 | S1 = 1.00, S2 = 0.5, S3 = 0 |
| Security issue | Yes | 20 | 20 | Yes = 1, No = 0 |
| Customers impacted | 100 | 1 | 10 | ≤10 = 1, ≤50 = 5, ≤100 = 10 |
| Total number of days bug present | 50 | 1 | 3 | ≥30 days = 3, ≥14 days = 2, <14 days = 1 |
| Count of agents facing issues | 100 | 1 | 10 | ≤10 = 1, ≤50 = 5, ≤100 = 10 |
| SLA violated | Yes | 1 | 2 | Yes = 2, No = 0 |
| Degradation in call handling | Yes | 1 | 10 | If call queue is increasing, then set as 10 |
| Any other ACD monitoring parameter impacted | No | 1 | 0 | Increment 1 point per monitoring parameter impacted |
| Any other service level monitoring parameter impacted | No | 1 | 0 | Increment 1 point per monitoring parameter impacted |
| | | | SUM (incident grievance score) = 88 | |

In certain embodiments, issue triaging system 400 builds, trains, and deploys the machine learning model for calculating or predicting the incident grievance score and predicting the priority of the customer issue based on the incident grievance score. In several embodiments, the machine learning model is trained on a variety of input parameters such as the account impact rank, severity of the issue in question, whether the issue is a security issue, the number and type of customers impacted, the age of the issue, the number of agents facing the issue, whether the SLA is violated or approaching a violation threshold, whether there is a degradation in call handling; whether there is a workaround available, the type of license involved, what license specific monitoring parameters are affected, and what service and application specific monitoring parameters are affected. All of this input data may be collected as described above in step 502.

In some embodiments, the data is preprocessed before it is used for building the machine learning model. In an exemplary embodiment, preprocessing includes accounting for missing data, encoding categorical data, splitting the data into training and test data, and feature scaling. For example, any missing data for numerical features are replaced by the average of the data present for that feature. One hot encoding technique can be used for encoding the categorical data where multiple categories are present in a feature. Label encoding can be used to encode the data where only two categories are present including the dependent variable. In one embodiment, 80% of the data is used as the training set, and 20% is used as the test set. The percentage of test and training data may be varied, however, while training the model. In various libraries and machine learning algorithms, feature scaling is not mandatory, but is helpful in training the model more effectively. In one embodiment, the standardization technique is used for feature scaling, and is used after the data set is divided into training and test sets. Feature scaling is typically not applied to encoded values.

Once the data is preprocessed, the machine learning model can be trained with various classification algorithms. Some of the algorithms that may be used include multiple linear regression, logistic regression, and support vector machine. These algorithms can be evaluated and compared. Various methodologies like Root Mean Square Error (RMSE), Adjusted R Square, and Mean Absolute Error (MAE) may be used to evaluate model prediction. Once the "best" machine learning model is identified, it may be used to predict and calculate the incident grievance score.

At step 506, issue triaging system 400 assigns a priority to the customer issue based on the calculated incident grievance score. The higher the incident grievance score, the higher the priority of the customer issue.

At step 508, issue triaging system 400 receives updated input regarding the customer issue. For example, some of the input (such as number of impacted customers and agents, and the age of the customer issue) may have changed.

At step 510, issue triaging system 400 periodically recalculates the incident grievance score by inserting the received input and the updated input into the machine learning model. In one embodiment, issue triaging system 400 recalculates the incident grievance score daily. If the customer issue is marked as resolved or the incident grievance score changes, a notification can be sent to stakeholders.

At step 512, issue triaging system 400 changes the priority of the customer issue when the recalculated incident grievance score differs from the calculated grievance score. For example, if the recalculated grievance score is higher than the previously calculated grievance, the priority of the customer issue is higher.

At step 514, issue triaging system 400 notifies a team assigned to fix the customer issue when the priority of the customer issue changes. In various embodiments, the team is also notified when the customer issue is close to an SLA violation.

Figure 6:
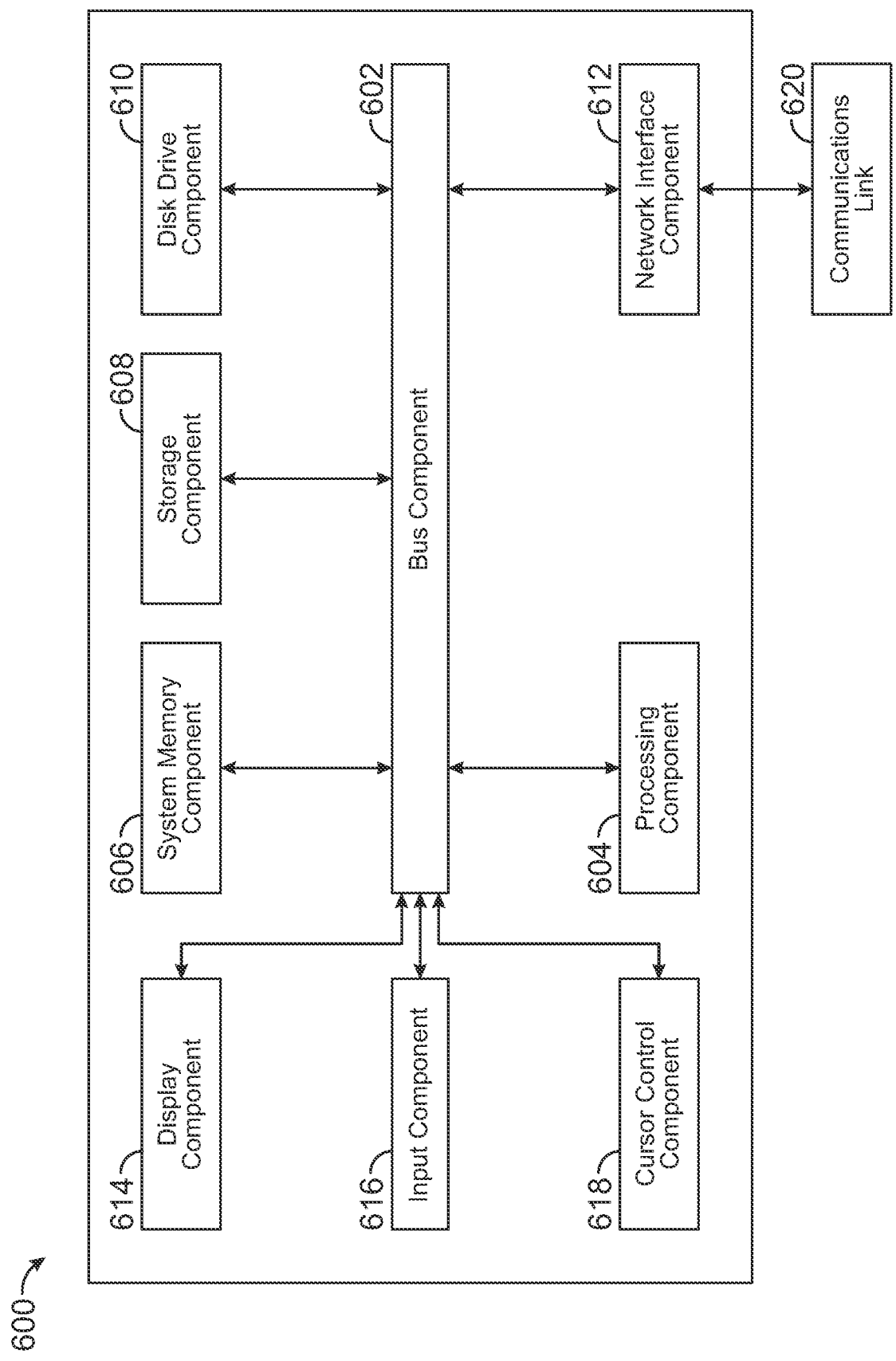
FIG. 6 is a block diagram of a computer system suitable for implementing one or more components in FIG. 1 according to one embodiment of the present disclosure.

Referring now to FIG. 6, illustrated is a block diagram of a system 600 suitable for implementing embodiments of the present disclosure, including issue triaging system 400. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to receive input regarding a customer issue experienced by a customer; calculate, by a priority analytics engine, an incident grievance score by inserting the received input into a machine learning model; assign a priority to the customer issue based on the calculated incident grievance score; receive updated input regarding the customer issue; periodically recalculate, by the priority analytics engine, the incident grievance score for the customer issue by inserting the received input and the updated input into the machine learning model; change the priority of the customer issue when the recalculated incident grievance score differs from the calculated incident grievance score; and notify a team assigned to fix the customer issue when the priority of the customer issue changes. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that comprise bus 602. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An issue triaging system comprising:
  a processor and a computer readable medium operably coupled thereto, the computer readable medium comprising a plurality of instructions stored in association therewith that are accessible to, and executable by, the processor, to perform operations which comprise:
    receiving, by a data aggregation application from a call center application, administrative web application, or other data source, input regarding a customer issue experienced by a customer, wherein the input comprises whether there is a degradation in handling of a customer communication, an age of the customer issue, and an account impact rank;
    determining whether there is a degradation in handling of the customer communication by determining whether a call queue size is more than an average call queue size;

determining that the customer handles a critical service selected from healthcare, translation services, or accidental insurance when calculating the account impact rank;

awarding the customer who handles the critical service more points than a customer that does not handle the critical service to provide a higher value for the account impact rank;

receiving, by a priority analytics engine from the data aggregation application, the input;

training a machine learning model to predict an incident grievance score;

calculating, by the priority analytics engine, the incident grievance score by inserting the received input into the machine learning model, wherein the higher value for the account impact rank results in a higher incident grievance score;

assigning a priority to the customer issue based on the calculated incident grievance score;

receiving updated input regarding the customer issue;

periodically recalculating, by the priority analytics engine, the incident grievance score for the customer issue by inserting the received input and the updated input into the machine learning model;

changing the priority of the customer issue when the recalculated incident grievance score differs from the calculated incident grievance score; and notifying, by the priority analytics engine to a device associated with a team assigned to fix the customer issue, when the priority of the customer issue changes.

2. The issue triaging system of claim 1, wherein the input further comprises one or more of a severity of the customer issue; whether the customer issue is a security issue; a number and type of customer impacted by the customer issue; a number of agents impacted by the customer issue; whether a service level agreement is violated; whether a workaround is available; a type of license involved in the customer issue; a number of license specific monitoring parameters affected by the customer issue; or a number of service and application monitoring parameters affected by the customer issue.

3. The issue triaging system of claim 1, wherein the operations further comprise comparing the received input for the customer issue with previously received inputs to determine whether the customer issue was previously reported.

4. The issue triaging system of claim 3, wherein the operations further comprise:
determining that the customer issue was not previously reported; and
creating an incident report from the received input in a workflow management tool.

5. The issue triaging system of claim 1, wherein the incident grievance score for the customer issue is recalculated daily.

6. The issue triaging system of claim 1, wherein:
the received input comprises data associated with a plurality of customer issues experienced by a plurality of customers, and
training the machine learning model comprises utilizing the data.

7. The issue triaging system of claim 1, wherein the operations further comprise:
encoding categorical data; and
building the machine learning model.

8. A method of assessing the priority of a customer reported issue, which comprises:
receiving, by a data aggregation application from a call center application, administrative web application, or other data source, input regarding a customer issue experienced by a customer, wherein the input comprises whether there is a degradation in handling of a customer communication, an age of the customer issue, and an account impact rank;

determining whether there is a degradation in handling of the customer communication by determining whether a call queue size is more than an average call queue size;

determining that the customer handles a critical service selected from healthcare, translation services, or accidental insurance when calculating the account impact rank;

awarding the customer who handles the critical service more points than a customer that does not handle the critical service to provide a higher value for the account impact rank;

receiving, by a priority analytics engine from the data aggregation application, the input;

training a machine learning model to predict an incident grievance score;

calculating, by the priority analytics engine, the incident grievance score by inserting the received input into the machine learning model, wherein the higher value for the account impact rank results in a higher incident grievance score;

assigning a priority to the customer issue based on the calculated incident grievance score;

receiving updated input regarding the customer issue;

periodically recalculating, by the priority analytics engine, the incident grievance score for the customer issue by inserting the received input and the updated input into the machine learning model;

changing the priority of the customer issue when the recalculated incident grievance score differs from the calculated incident grievance score; and notifying, by the priority analytics engine to a device associated with a team assigned to fix the customer issue, when the priority of the customer issue changes.

9. The method of claim 8, wherein the input further comprises one or more of a severity of the customer issue; whether the customer issue is a security issue; a number and type of customer impacted by the customer issue; a number of agents impacted by the customer issue; whether a service level agreement is violated; whether a workaround is available; a type of license involved in the customer issue; a number of license specific monitoring parameters affected by the customer issue; or a number of service and application monitoring parameters affected by the customer issue.

10. The method of claim 8, further comprising comparing the received input for the customer issue with previously received inputs to determine whether the customer issue was previously reported.

11. The method of claim 10, further comprising:
determining that the customer issue was not previously reported; and
creating an incident report from the received input in a workflow management tool.

12. The method of claim 8, wherein the incident grievance score for the customer issue is recalculated daily.

13. The method of claim 8, further comprising:
encoding categorical data; and
building the machine learning model.

14. A non-transitory computer-readable medium having stored thereon computer-readable instructions executable by a processor to perform operations which comprise:
- receiving, by a data aggregation application from a call center application, administrative web application, or other data source, input regarding a customer issue experienced by a customer, wherein the input comprises whether there is a degradation in handling of a customer communication, an age of the customer issue, and an account impact rank;
- determining whether there is a degradation in handling of the customer communication by determining whether a call queue size is more than an average call queue size;
- determining that the customer handles a critical service selected from healthcare, translation services, or accidental insurance when calculating the account impact rank;
- awarding the customer who handles the critical service more points than a customer that does not handle the critical service to provide a higher value for the account impact rank;
- receiving, by a priority analytics engine from the data aggregation application, the input;
- training a machine learning model to predict an incident grievance score;
- calculating, by the priority analytics engine, an incident grievance score by inserting the received input into the machine learning model, wherein the higher value for the account impact rank results in a higher incident grievance score;
- assigning a priority to the customer issue based on the calculated incident grievance score;
- receiving updated input regarding the customer issue;
- periodically recalculating, by the priority analytics engine, the incident grievance score for the customer issue by inserting the received input and the updated input into the machine learning model;
- changing the priority of the customer issue when the recalculated incident grievance score differs from the calculated incident grievance score; and
- notifying, by the priority analytics engine to a device associated with a team assigned to fix the customer issue, when the priority of the customer issue changes.

15. The non-transitory computer-readable medium of claim 14, wherein the input further comprises one or more of a severity of the customer issue; whether the customer issue is a security issue; a number and type of customer impacted by the customer issue; a number of agents impacted by the customer issue; whether a service level agreement is violated; whether a workaround is available; a type of license involved in the customer issue; a number of license specific monitoring parameters affected by the customer issue; or a number of service and application monitoring parameters affected by the customer issue.

16. The non-transitory computer-readable medium of claim 14, wherein the operations further comprise:
- comparing the received input for the customer issue with previously received inputs to determine whether the customer issue was previously reported;
- determining that the customer issue was not previously reported; and
- creating an incident report from the received input in a workflow management tool.

17. The non-transitory computer-readable medium of claim 14, wherein the operations further comprise:
- determining that the customer issue was resolved;
- notifying the customer that the customer issue was resolved; and
- requesting feedback from the customer.

18. The non-transitory computer-readable medium of claim 14, wherein the operations further comprise:
- encoding categorical data; and
- building the machine learning model.

* * * * *